US012700799B2

(12) United States Patent      (10) Patent No.:    US 12,700,799 B2

Gupta et al.            (45) Date of Patent:       Aug. 4, 2026

(54) CHARGE PUMP RECTIFIER

(71) Applicant: TEXAS INSTRUMENTS INCORPORATED, Dallas, TX (US)

(72) Inventors: Arvind Gupta, New Delhi (IN);
Kashyap Barot, Bangalore (IN);
Sreeram Nasum S, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 214 days.

(21) Appl. No.: 18/362,040

(22) Filed: Jul. 31, 2023

(65) Prior Publication Data

US 2025/0047199 A1     Feb. 6, 2025

(51) Int. Cl.
H02M 3/07        (2006.01)
(52) U.S. Cl.
CPC ..................................... H02M 3/07 (2013.01)
(58) Field of Classification Search
CPC .... H02M 3/07–073; H02M 7/06; H02M 7/10; H02M 7/19; H02M 7/25; H02M 2003/077

USPC ....................................................... 363/59–61
See application file for complete search history.

(56) References Cited

U.S. PATENT DOCUMENTS 9,826,583 B1 * 11/2017 Xiong ........................ G05F 1/56

* cited by examiner

*Primary Examiner* — Bryan R Perez
(74) *Attorney, Agent, or Firm* — Xianghui Huang; Frank D. Cimino

(57)            ABSTRACT

A circuit includes a charge pump stage and a common-mode filter. The charge pump stage includes first and second transistors, and first and second capacitors. The second transistor has a first terminal coupled to a control terminal of the first transistor, has a second terminal, and has a control terminal coupled to a first terminal of the first transistor. The first capacitor is coupled between a second terminal of the first transistor and the control terminal of the first transistor. The second capacitor is coupled between the second terminal of the second transistor and the control terminal of the second transistor. The common-mode filter includes third and fourth capacitors. The third capacitor is coupled between the second terminal of the first transistor and the control terminal of the first transistor. The fourth capacitor is coupled between the third capacitor and the control terminal of the second transistor.

23 Claims, 8 Drawing Sheets

100

400

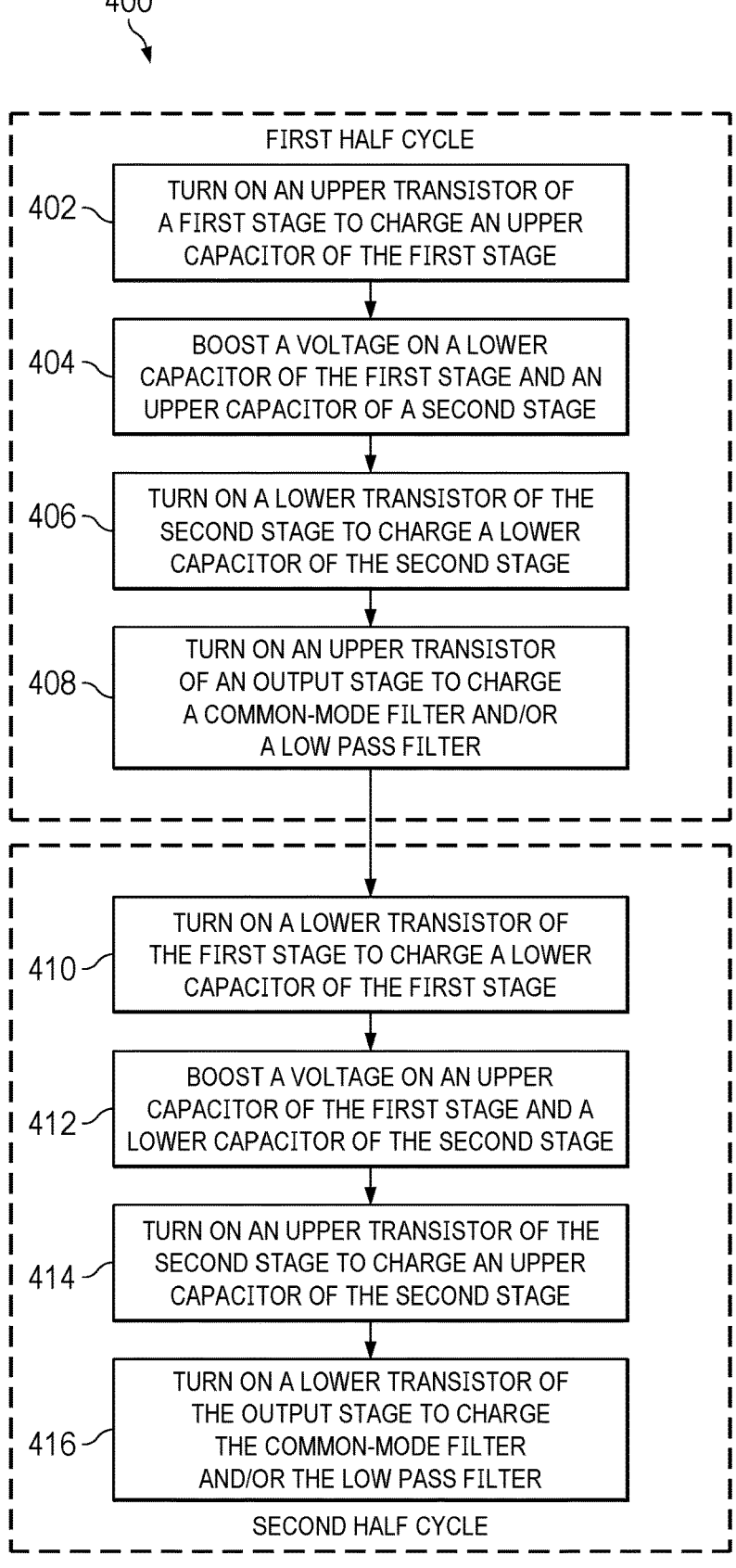

FIRST HALF CYCLE

402 — TURN ON AN UPPER TRANSISTOR OF A FIRST STAGE TO CHARGE AN UPPER CAPACITOR OF THE FIRST STAGE

404 — BOOST A VOLTAGE ON A LOWER CAPACITOR OF THE FIRST STAGE AND AN UPPER CAPACITOR OF A SECOND STAGE

406 — TURN ON A LOWER TRANSISTOR OF THE SECOND STAGE TO CHARGE A LOWER CAPACITOR OF THE SECOND STAGE

408 — TURN ON AN UPPER TRANSISTOR OF AN OUTPUT STAGE TO CHARGE A COMMON-MODE FILTER AND/OR A LOW PASS FILTER

410 — TURN ON A LOWER TRANSISTOR OF THE FIRST STAGE TO CHARGE A LOWER CAPACITOR OF THE FIRST STAGE

412 — BOOST A VOLTAGE ON AN UPPER CAPACITOR OF THE FIRST STAGE AND A LOWER CAPACITOR OF THE SECOND STAGE

414 — TURN ON AN UPPER TRANSISTOR OF THE SECOND STAGE TO CHARGE AN UPPER CAPACITOR OF THE SECOND STAGE

416 — TURN ON A LOWER TRANSISTOR OF THE OUTPUT STAGE TO CHARGE THE COMMON-MODE FILTER AND/OR THE LOW PASS FILTER

SECOND HALF CYCLE

FIG. 4

CHARGE PUMP RECTIFIER

BACKGROUND

Isolation is useful in electrical circuits to prevent the flow of direct currents and undesirable alternating currents between two parts of a system. While preventing flow of undesirable currents between parts of a system, isolation may allow signal transfer between the isolated parts of the system. Isolation may be provided by integrated circuits referred to as isolators. Electronic systems may include isolators for safety reasons and/or to protect electronic components of the systems (such as systems where one set of circuitry operates at a much higher voltage than another set of circuitry). For example, where two systems need to communicate, but the systems have grounds that may be at different potentials, communication may be through an isolator that is tied to the grounds of both systems, but which allows no current flow between the grounds. Various types of isolators may include optical coupling, capacitive coupling, inductive coupling (e.g., a transformer), or other types of coupling to isolate systems while allowing communication between the systems.

SUMMARY

In one example, a circuit includes a charge pump stage and a common-mode filter. The charge pump stage includes first and second transistors, and first and second capacitors. The first transistor has first and second terminals and a control terminal. The second transistor has a first terminal coupled to the control terminal of the first transistor, has a second terminal, and has a control terminal coupled to the first terminal of the first transistor. The first capacitor has a first conductor coupled to the second terminal of the first transistor and has a second conductor coupled to the control terminal of the first transistor. The second capacitor has a first conductor coupled to the second terminal of the second transistor and has a second conductor coupled to the control terminal of the second transistor. The common-mode filter includes third and fourth capacitors. The third capacitor has a first conductor coupled to the second terminal of the first transistor and has a second conductor coupled to the control terminal of the first transistor. The fourth capacitor has a first conductor coupled to the first conductor of the third capacitor and has a second conductor coupled to the control terminal of the second transistor.

In another example, a method includes, in a first half of a cycle of a differential signal, turning on a first transistor of a first charge pump stage to charge a top plate of a first capacitor of the first charge pump stage and boosting a voltage on a top plate of a second capacitor of the first charge pump stage. The method also includes, in the first half cycle, boosting a voltage on a top plate of a third capacitor of a second charge pump stage, and turning on a second transistor of the second charge pump stage, based on a voltage at the top plate of the first capacitor, to charge a top plate of a fourth capacitor of the second charge pump stage.

In a further example, an isolator circuit includes a transformer, a charge pump stage, and a common-mode filter. The transformer includes a primary winding and a secondary winding. The secondary winding has a first winding terminal, a second winding terminal, and a center tap terminal. The charge pump stage includes first and second transistors, and first and second capacitors. The first transistor has a first terminal coupled to the first winding terminal, has a second terminal, and has a control terminal coupled to the second winding terminal. The second transistor has a first terminal coupled to the second winding terminal, has a second terminal, and has a control terminal coupled to the first winding terminal. The first capacitor has a first conductor coupled to the second terminal of the first transistor, and has a second conductor coupled to the second winding terminal. The second capacitor has a first conductor coupled to the second terminal of the second transistor, and has a second conductor coupled to the first winding terminal. The common-mode filter includes third and fourth capacitors. The third capacitor has a first conductor coupled to the second terminal of the first transistor, and has a second conductor coupled to the second winding terminal. The fourth capacitor has a first conductor coupled to the first conductor of the third capacitor, and has a second conductor coupled to the first winding terminal.

BRIEF DESCRIPTION OF THE DRAWINGS

FIG. 4 is a flow diagram for an example method of charge pump rectification.

DETAILED DESCRIPTION

Figure 1:
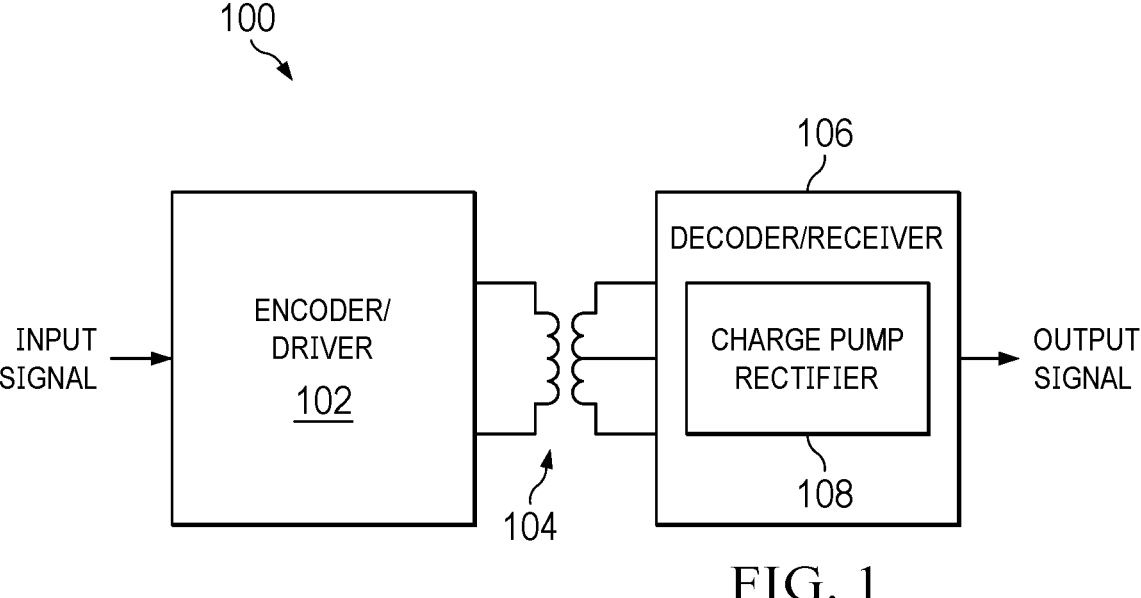
FIG. 1 is a block diagram of an example digital isolator circuit.

FIG. 1 is a block diagram of an example digital isolator circuit 100. The digital isolator circuit 100 includes an encoder/driver circuit 102, a transformer 104, and a decoder/receiver circuit 106. The transformer 104 is coupled between the encoder/driver circuit 102 and the decoder/receiver circuit 106. Outputs of the encoder/driver circuit 102 are coupled to a primary coil of the transformer 104. Inputs of the decoder/receiver circuit 106 are coupled to a secondary coil of the transformer 104. The encoder/driver circuit 102 receives an input signal, encodes the input signal for transmission via the transformer 104, and drives the encoded signal to the transformer 104. In some examples, the encoder/driver circuit 102 may apply on-off encoding (OOK) to encode the input signal, and drive the OOK encoded input signal to the primary coil of the transformer 104.

The decoder/receiver circuit 106 receives the encoded signals via the transformer 104, and decodes the received signals to generate a digital output signal. The decoder/receiver circuit 106 includes a charge pump rectifier circuit 108. The charge pump rectifier circuit 108 rectifies the signal received via the transformer 104, and boosts the rectified signal to generate the DC voltage of the output signal.

Figure 2:
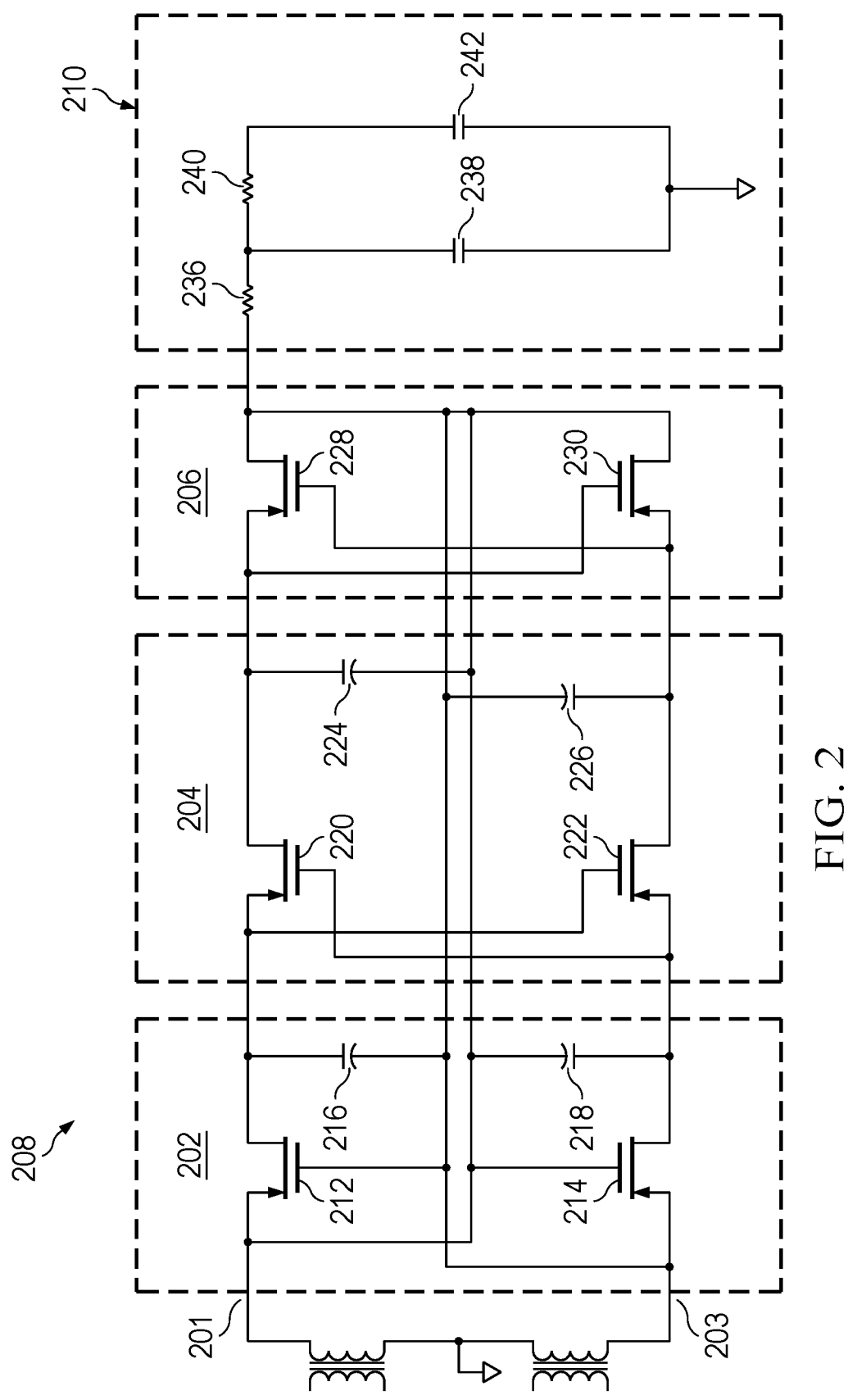
FIG. 2 is a schematic diagram of an example two-stage charge pump rectifier.

FIG. 2 is a schematic diagram of an example charge pump rectifier circuit 208. The charge pump rectifier circuit 208 is an example of the charge pump rectifier circuit 108. The example charge pump rectifier circuit 208 shown in FIG. 2 is a two-stage charge pump rectifier circuit. In the charge pump rectifier circuit 208, the received signal controls the switching that boosts the voltage representing the received signal, and no additional clock signal is needed. The charge pump rectifier circuit 208 includes a first charge pump stage 202, a second charge pump stage 204, an output stage 206, and low-pass filter 210 (also referred to as a filter circuit 210). The first charge pump stage 202 is coupled between the transformer 104 and the second charge pump stage 204. The second charge pump stage 204 is coupled between the first charge pump stage 202 and the output stage 206. The low-pass filter 210 is coupled to the output stage 206.

The first charge pump stage 202 includes transistors 212 and 214, and capacitors 216 and 218. The transistors 212 and 214 may be p-channel field effect transistors (PFETs). A first current terminal (e.g., source) of the transistor 212 is coupled to a first signal input terminal 201. The first signal input terminal 201 may be coupled to a first winding terminal of the secondary coil of the of the transformer 104. A second current terminal (e.g., drain) of the transistor 212 is coupled to a top plate of the capacitor 216. A bottom plate of the capacitor 216 is coupled to a control terminal (e.g., gate) of the transistor 212 and to a second signal input terminal 203. The second signal input terminal 203 may be coupled to a second winding terminal of the secondary coil of the of the transformer 104. Elements of the circuit may be coupled to plates of the capacitor via terminals of the capacitor. Similarly, elements of the circuit may be coupled to windings of the transformer via terminals of the transformer. Also, top and bottom plates may be referred to as first and second conductors.

A first current terminal (e.g., source) of the transistor 214 is coupled to the second signal input terminal 203. A second current terminal (e.g., drain) of the transistor 214 is coupled to a top plate of the capacitor 218. A bottom plate of the capacitor 218 is coupled to a control terminal (e.g., gate) of the transistor 214 and to the first signal input terminal 201.

The second charge pump stage 204 is structurally similar to the first charge pump stage 202, and includes transistors 220 and 222, and capacitors 224 and 226. The transistors 220 and 222 may be PFETs. A first current terminal (e.g., source) of the transistor 220 is coupled to the top plate of the capacitor 216. A second current terminal (e.g., drain) of the transistor 220 is coupled to a top plate of the capacitor 224. A control terminal (e.g., gate) of the transistor 220 is coupled to the top plate of the capacitor 218. A bottom plate of the capacitor 224 is coupled to the first signal input terminal 201.

A first current terminal (e.g., source) of the transistor 222 is coupled to the top plate of the capacitor 218. A second current terminal (e.g., drain) of the transistor 214 is coupled to a top plate of the capacitor 226. A control terminal (e.g., gate) of the transistor 222 is coupled to the top plate of the capacitor 216. A bottom plate of the capacitor 226 is coupled to the second signal input terminal 203.

The output stage 206 includes transistors 228 and 230. A first current terminal (e.g., source) of the transistor 228 is coupled to the top plate of the capacitor 224, and a control terminal (e.g., gate) of the transistor 228 is coupled to the top plate of the capacitor 226. A first current terminal (e.g., source) of the transistor 230 is coupled to the top plate of the capacitor 226, and a control terminal (e.g., gate) of the transistor 230 is coupled to the top plate of the capacitor 224. A second current terminal (e.g., drain) of the transistor 228 is coupled to a second current terminal (e.g., drain) of the transistor 230.

The low-pass filter 210 includes resistors 236 and 240, and capacitors 238 and 242. A first terminal of the resistor 236 is coupled to the second current terminals of the transistors 228 and 230. A second terminal of the resistor 236 is coupled to a top plate of the capacitor 238. The resistor 236 and the capacitor 238 form a first low-pass filter stage. A bottom plate of the capacitor 238 is coupled to a reference terminal. The reference terminal may be coupled to a center tap terminal of the transformer 104. A first terminal of the resistor 240 is coupled to the top plate of the capacitor 238. A second terminal of the resistor 240 is coupled to a top plate of the capacitor 242 and to a circuit output of the charge pump rectifier circuit 108. The resistor 240 and the capacitor 242 form a second low-pass filter stage. A bottom plate of the capacitor 242 is coupled to the reference terminal.

Figure 3:
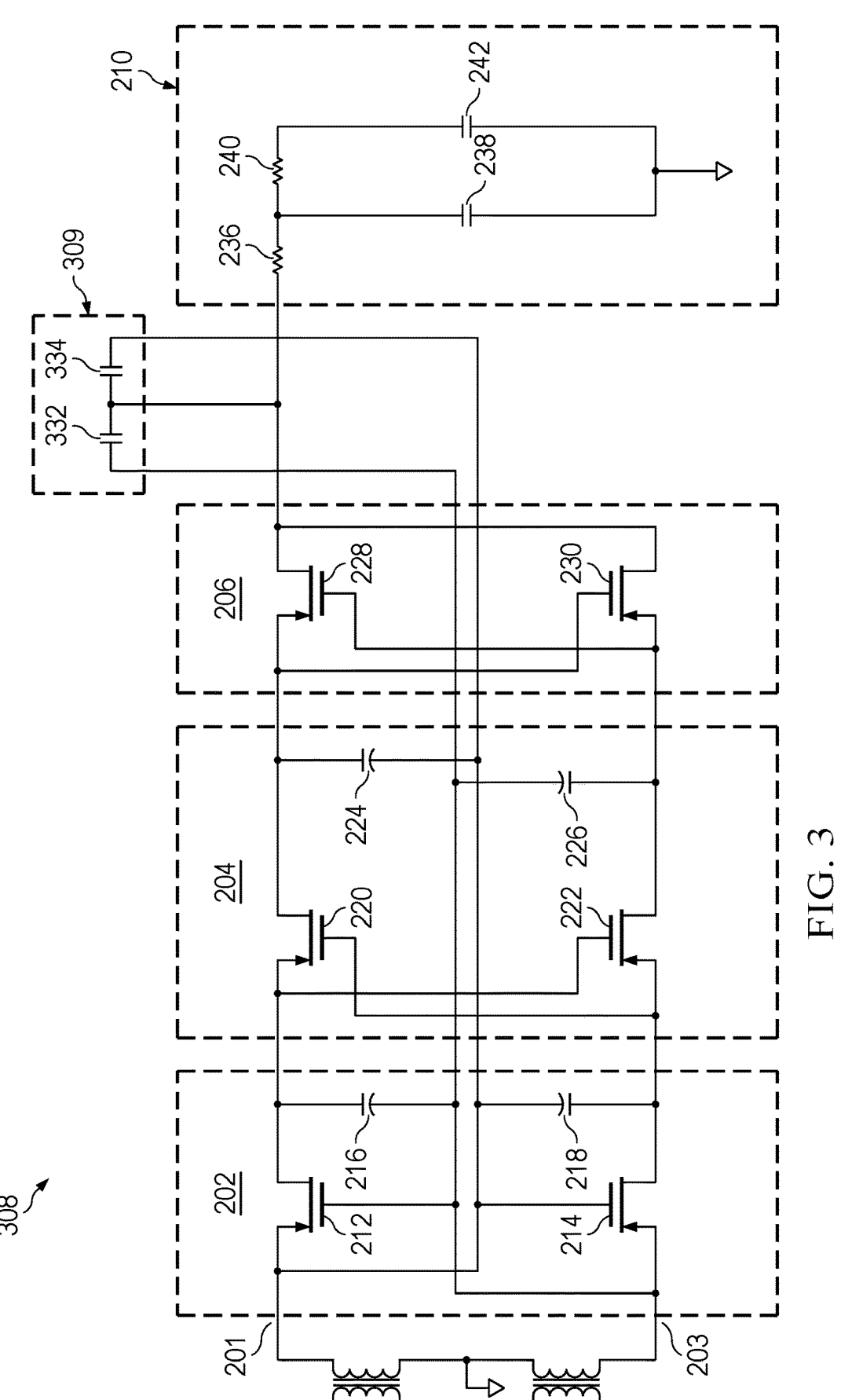
FIG. 3 is a schematic diagram of an example two-stage charge pump rectifier that includes common-mode filtering.

FIG. 3 is a schematic diagram of another example two-stage charge pump rectifier circuit 308. The charge pump rectifier circuit 308 is similar to the charge pump rectifier circuit 208 and includes a common-mode filter 309 coupled between the second current terminals of the transistors 228 and 230 and the first and second signal input terminals. The common-mode filter 309 provides immunity to radiated electromagnetic fields by reducing the common mode voltage induced by radiated electromagnetic signals at the output of the 308. The common-mode filter 309 includes capacitors 332 and 334. A top plate of the capacitor 332 is coupled to a top plate of the capacitor 334 and to the second current terminals of the transistors 228 and 230, to the control terminals of transistors 212 and 214, and to the plates of capacitors 216 and 226. A bottom plate of the capacitor 332 is coupled to the second signal input terminal 203, the control terminal of the transistor 212, the bottom plate of the capacitor 216, and the bottom plate of the capacitor 226. A bottom plate of the capacitor 334 is coupled to the first signal input terminal 201, the control terminal of the transistor 214, the bottom plate of the capacitor 218, and the bottom plate of the capacitor 224.

Figure 5:
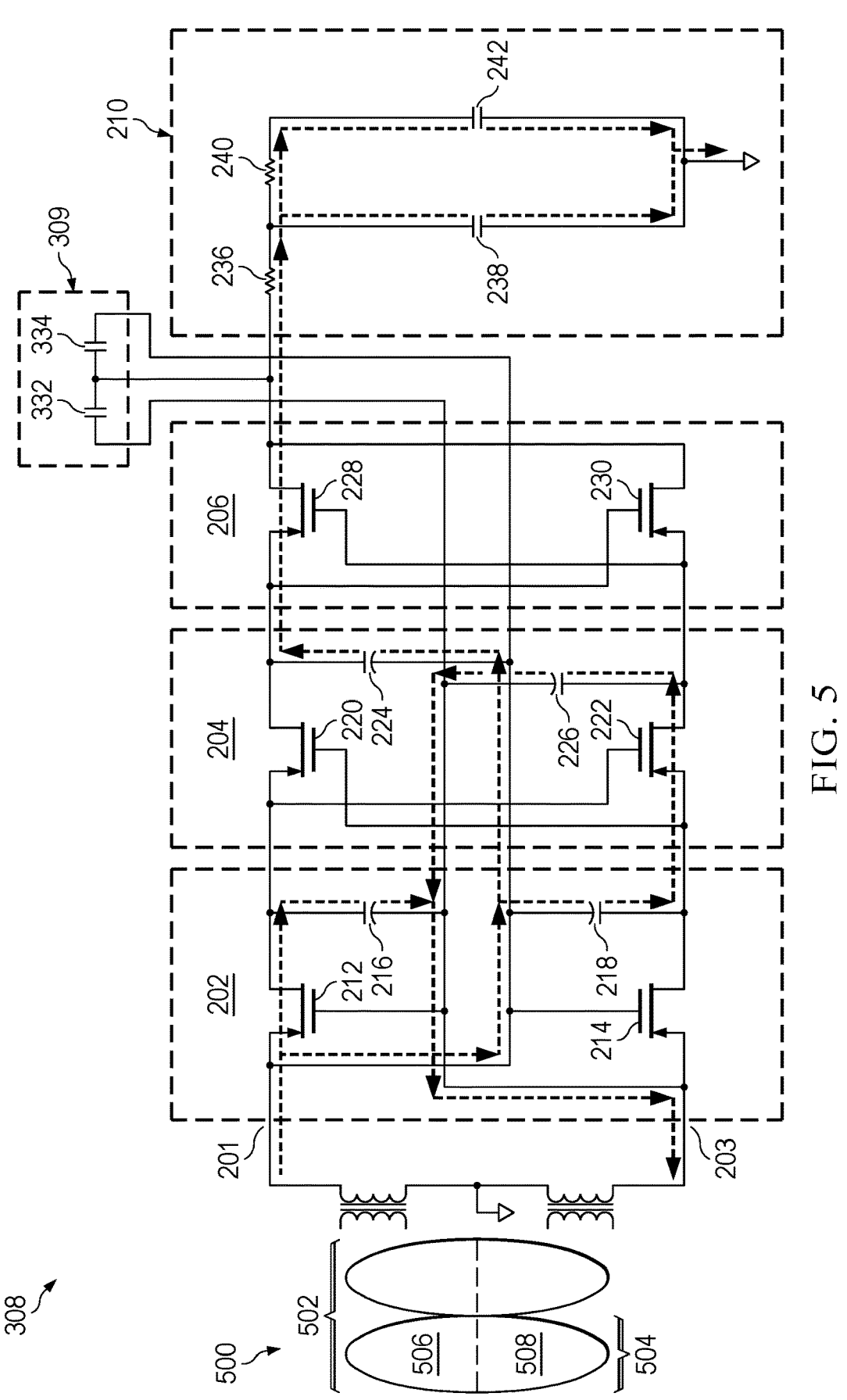
FIG. 5 illustrates operation of the two-stage charge pump rectifier of FIG. 3 in a first half of an alternating current cycle.
Figure 6:
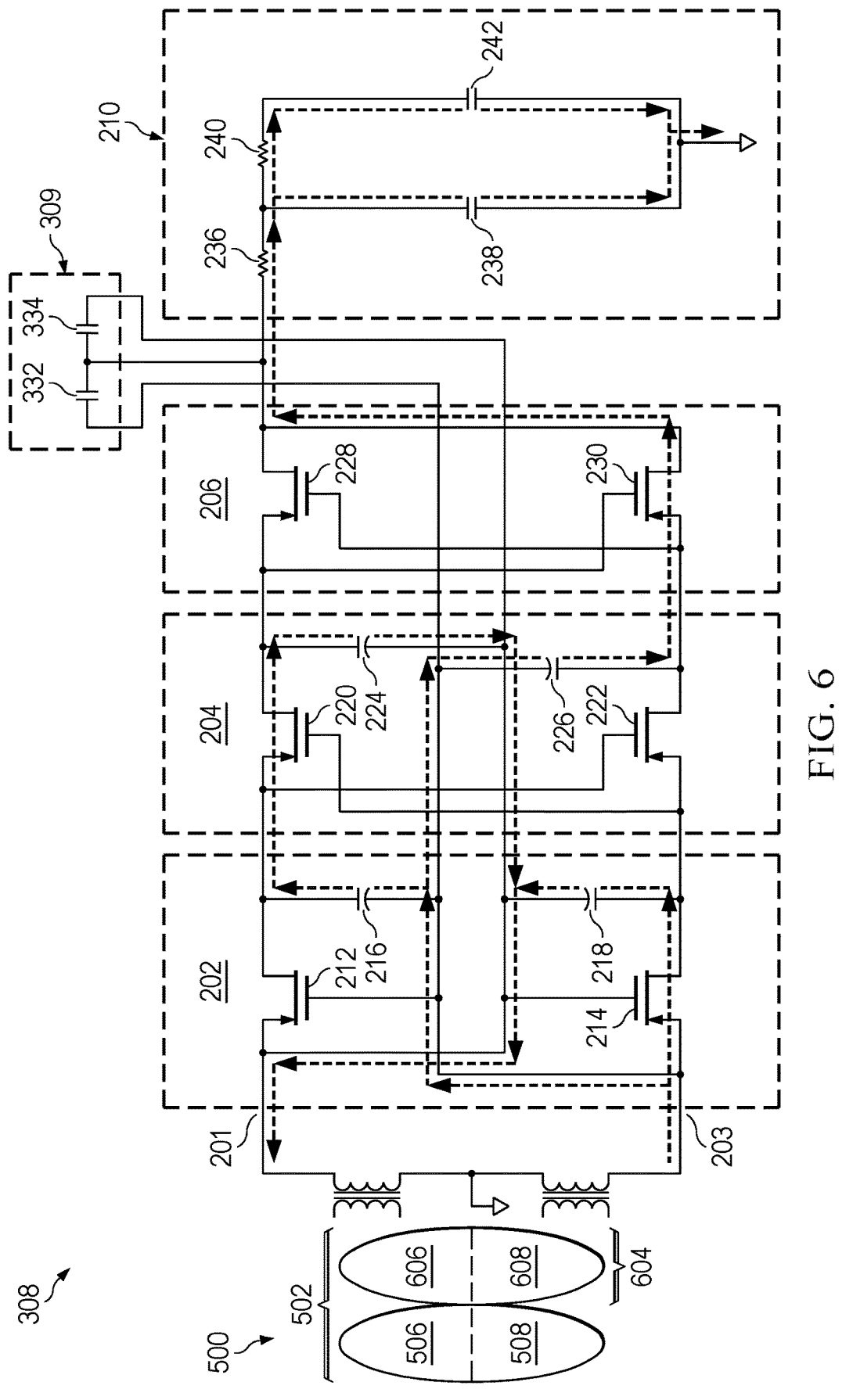
FIG. 6 illustrates operation of the two-stage charge pump rectifier of FIG. 3 in a second half of an alternating current cycle.

FIG. 4 is a flow diagram for an example method 400 of charge pump rectification in the charge pump rectifier circuit 208 or the charge pump rectifier circuit 308. Though depicted sequentially as a matter of convenience, at least some of the actions shown can be performed in a different order and/or performed in parallel. Additionally, some implementations may perform only some of the actions shown. FIGS. 5 and 6 illustrate the operation of the method 400 in charge pump rectifier circuits 208 or 308.

In FIG. 5, a differential input signal 500 is provided at the first and second voltage input terminals of the charge pump rectifier circuit 308. The cycle 502 represents one cycle of the differential input signal 500. In FIG. 5, the half-cycle 504 (the first half cycle) is provided at the first and second voltage input terminals, with signal 506 (e.g., positive voltage) provided at the first signal input terminal 201, and signal 508 (e.g., negative voltage) provided at the second signal input terminal 203. The operations of the method 400 performed in the first half cycle are detailed in blocks 402-408 of the method 400.

In block 402 of the method 400, the transistor 212 (the upper transistor of the first charge pump stage) is turned-on to charge the top plate of the capacitor 216 (the upper capacitor of the first charge pump stage) based on the signal 506.

In block 404, the signal 506 charges the bottom plates of the capacitor 218 (the lower capacitor of the first charge pump stage) and the capacitor 224 (the upper capacitor of the second charge pump stage) to boost the voltage at the top plates of the capacitor 218 and the capacitor 224.

In block 406, the transistor 222 (the lower capacitor of the second stage) is turned-on to charge the top plate of the capacitor 226 based on the voltage on the top plate of the capacitor 218.

In block 408, in the output stage 206, the transistor 228 (the upper transistor of the output stage) is turned-on to provide the voltage at the top plate of the capacitor 224 to the common-mode filter 309 and the low-pass filter 210. The output stage 206 may perform similar to one-half of a charge-pump stage, and provide a voltage boost that is one-half that of a charge-pump stage. In the half-cycle 504, the transistors 214, 220, and 230 are turned off.

The common-mode filter 309 is a capacitive divider that is coupled to the first and second input voltage terminals to provide the common-mode voltage present at the first and second input voltage terminals at the input of the low-pass filter 210. Accordingly, any common-mode voltage present in the differential input signal 500 is provided at the top and bottom plates of the capacitor 238 and the capacitor 242 of the low-pass filter 210, which effectively removes the common mode voltage from the output signal of the charge pump rectifier circuit 108.

In FIG. 6, the half-cycle 604 (the second half cycle), which follows the half-cycle 504, is provided at the first and second voltage input terminals, with signal 608 (e.g., negative voltage) provided at the first signal input terminal 201, and signal 606 (e.g., positive voltage) provided at the second signal input terminal 203. The operations of the method 400 performed in the second half cycle are detailed in blocks 410-414 of the method 400.

In block 410 of the method 400, the transistor 214 (the lower transistor of the first charge pump stage) is turned-on to charge the top plate of the capacitor 218 (the lower capacitor of the first charge pump stage) based on the signal 606.

In block 412, the signal 606 charges the bottom plates of the capacitor 216 (the upper capacitor of the first charge pump stage) and the capacitor 226 (the lower capacitor of the second charge pump stage) to boost the voltage at the top plates of the capacitor 216 and the capacitor 226.

In block 414, the transistor 220 (the upper capacitor of the second charge pump stage) is turned-on to charge the top plate of the capacitor 224 (the upper capacitor of the second charge pump stage) based on the voltage on the top plate of the capacitor 216.

In block 416, the transistor 230 (the lower transistor of the output stage) is turned-on to provide the voltage at the top plate of the capacitor 226 to the common-mode filter 309 and/or the low-pass filter 210. In the half-cycle 604, the transistors 212, 222, and 228 are turned off.

While FIGS. 2, 3, 5, and 6 show a two-stage charge pump rectifier for explanatory purposes, examples of the charge pump rectifier circuit 108 are not limited to two charge pump stages. In other examples, the charge pump rectifier circuit 108 may include more or less than two charge pump stages. One example of the charge pump rectifier circuit 108 may include only one charge pump stage (e.g., first charge pump stage 202) followed by the output stage 206. Another example of the charge pump rectifier circuit 108 may include the output stage 206 coupled between the transformer 104 and the common-mode filter 309 with no charge pump stages (e.g., no charge pump stages 202 and 204) preceding the output stage 206.

Figure 7:
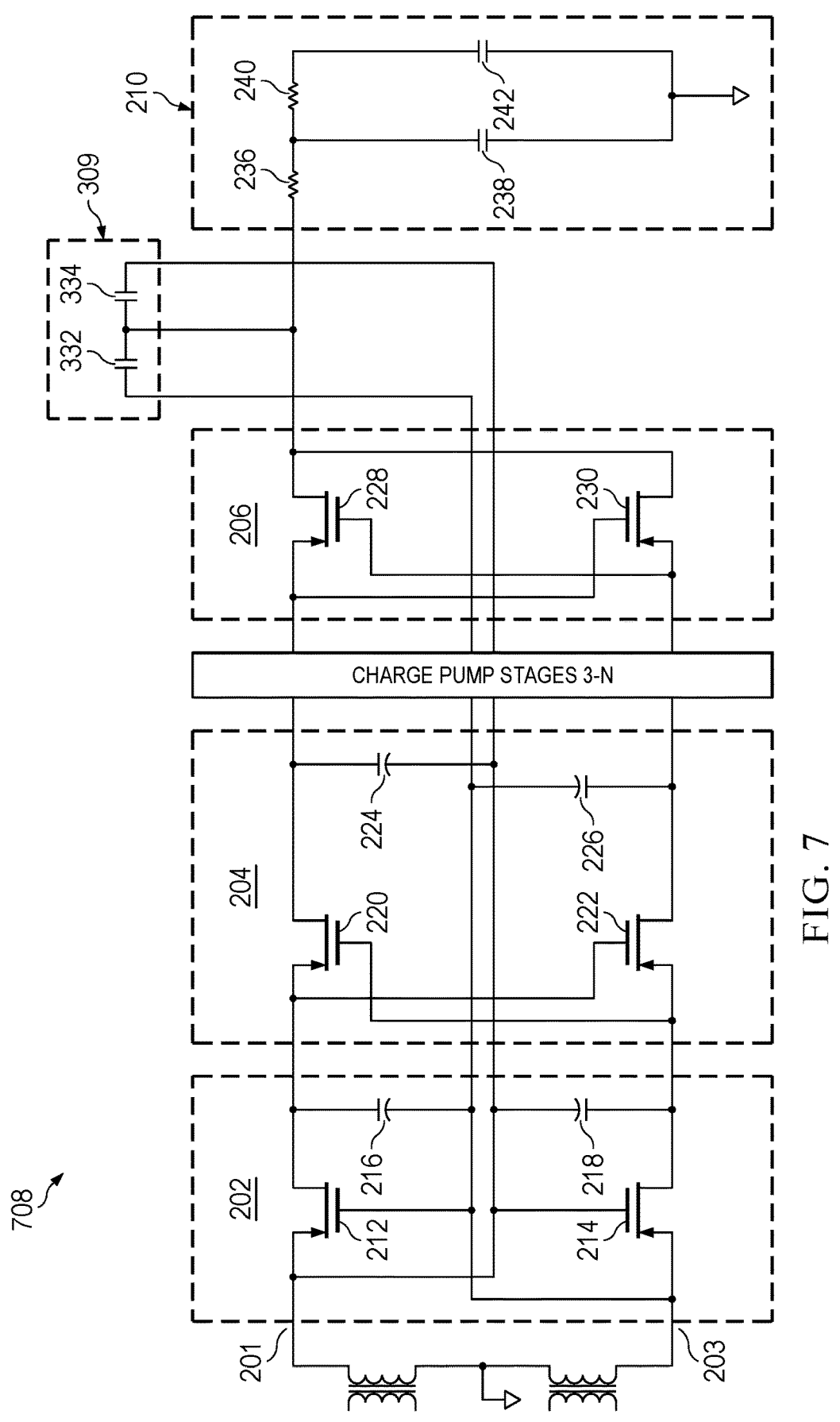
FIG. 7 is a schematic diagram of an example N-stage charge pump rectifier.

Other examples of the charge pump rectifier circuit 108 may include more than two charge pump stages. FIG. 7 is a schematic diagram of an example N-stage charge pump rectifier circuit 708, where N is greater than two. The N-stage charge pump rectifier circuit 708 is an example of the charge pump rectifier circuit 108. In the N-stage charge pump rectifier circuit 708, charge pump stages 3-N are coupled between the second charge pump stage 204 and the output stage 206. For example, the example of the N-stage charge pump rectifier circuit 708 shown in FIG. 7 may include five charge pump stages (three additional charge pump stages coupled between the second charge pump stage 204 and the output stage 206), where each of the charge pump stages 3-5 is similar to the first charge pump stage 202 and the second charge pump stage 204.

Each successive charge pump stage boosts the voltage output of the charge pump rectifier circuit 108. Referring to the transistors of the charge pump stages as upper and lower transistors (e.g., the transistor 212 is the upper transistor of the first charge pump stage 202, and the transistor 214 is the lower transistor of the first charge pump stage 202), in the half-cycle 504, the upper transistor of each odd numbered charge pump stage (e.g., charge pump stages 1, 3, 5, etc.) and the lower transistor of each even numbered charge pump stage (stages 2, 4, etc.) is turned on, and the lower transistor of each odd numbered charge pump stage and the upper transistor of even numbered charge pump stage is turned off. In the half-cycle 604, the upper transistor of each even numbered charge pump stage and the lower transistor of each odd numbered charge pump stage is turned on, and the upper transistor of each odd numbered charge pump stage and the lower transistor of even numbered charge pump stage is turned off.

Figure 8:
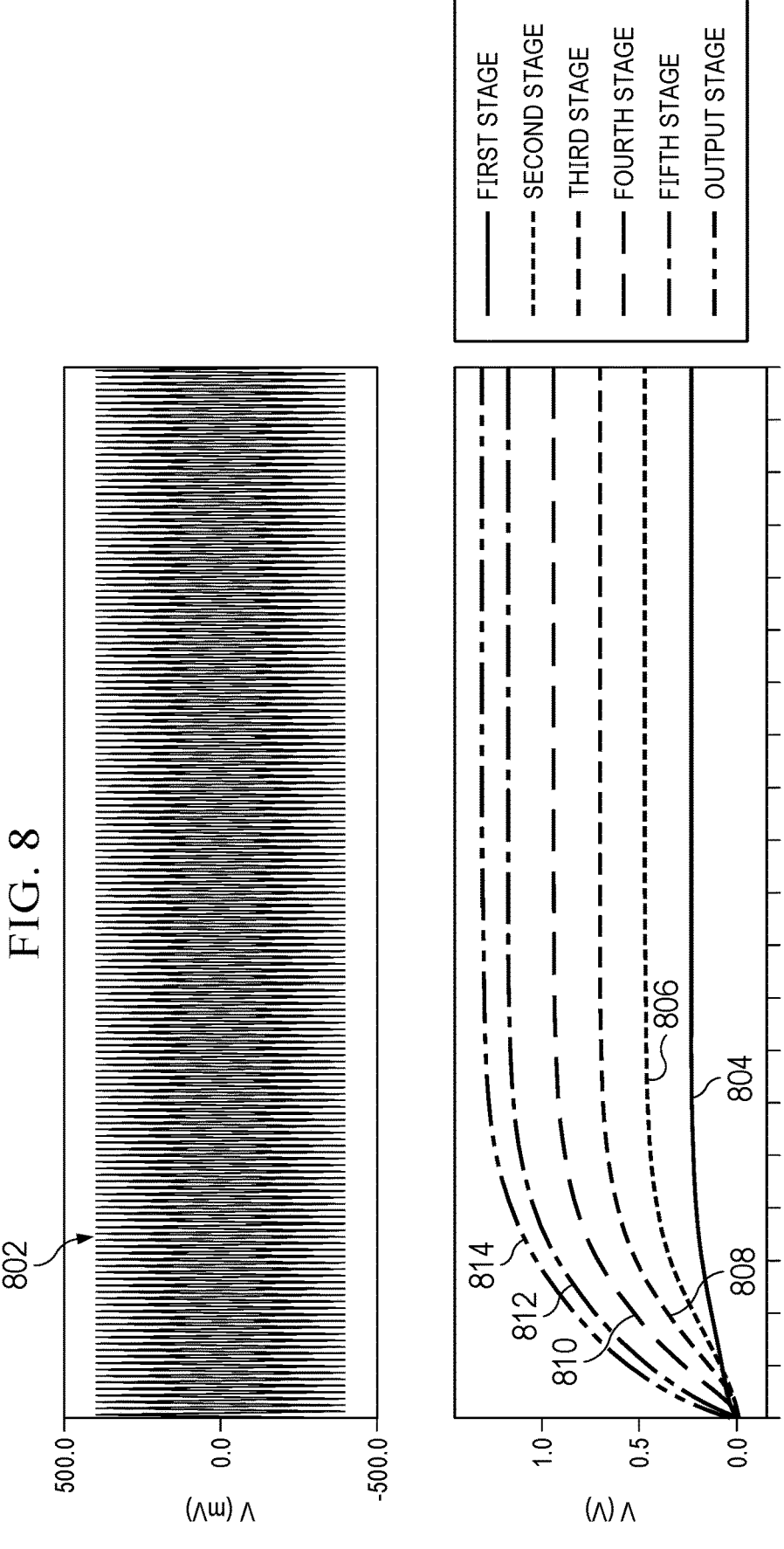
FIG. 8 is a graph of example voltages generated in an example of the charge pump rectifier of FIG. 7 having five charge pump stages.

FIG. 8 is a graph of example voltages generated in an example of the charge pump rectifier circuit 108 having five charge pump stages. In FIG. 8, the input signal 802 may be a differential sine wave with an amplitude of about 766 millivolts (mv) peak-to-peak. The frequency of the input signal 802 may be about 1-1.6 gigahertz in some examples. The frequency of the input signal 802 may be in a different range in other examples. Curves 804, 806, 808, 810, and 812 illustrate the voltages provided by the charge pump stages 1, 2, 3, 4, and 5, respectively. Curve 814 illustrates the voltage provided by the output stage. The voltages generated at the charge pump stages 1-5, and the output stage may be about 234 mv, 480 mv, 701 mv, 948 mv, 1169 mv, and 1306 mv, respectively. Other examples may use different input signal amplitudes or waveforms. For example, if the input signal is a differential square wave, rather than a differential sine wave, the boost provided in each of stages may be increased.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:
   a charge pump stage including:
      a first transistor having first and second terminals and a control terminal;
      a second transistor having a first terminal coupled to the control terminal of the first transistor, having a second terminal, and having a control terminal coupled to the first terminal of the first transistor;
      a first capacitor having a first conductor coupled to the second terminal of the first transistor and having a second conductor coupled to the control terminal of the first transistor; and
      a second capacitor having a first conductor coupled to the second terminal of the second transistor and having a second conductor coupled to the control terminal of the second transistor; and
   a common-mode filter including:
      a third capacitor having a first conductor coupled to the second terminal of the first transistor and having a second conductor coupled to the control terminal of the first transistor; and
      a fourth capacitor having a first conductor coupled to the first conductor of the third capacitor and having a second conductor coupled to the control terminal of the second transistor.

2. The circuit of claim 1, wherein:
   the charge pump stage is a first charge pump stage; and
   the circuit further comprises a second charge pump stage including:
      a third transistor having a first terminal coupled to the first conductor of the first capacitor, having a second terminal, and having a control terminal coupled to the first conductor of the second capacitor;
      a fourth transistor having a first terminal coupled to the first conductor of the second capacitor, having a second terminal, and having a control terminal coupled to the first conductor of the first capacitor;

a fifth capacitor having a first conductor coupled to the second terminal of the third transistor and having a second conductor coupled to the control terminal of the second transistor; and a sixth capacitor having a first conductor coupled to the second terminal of the fourth transistor and having a second conductor coupled to the control terminal of the first transistor.

3. The circuit of claim 2 further comprising an output stage including:

a fifth transistor having a first terminal coupled to the first conductor of the fifth capacitor, having a second terminal coupled to the first conductor of the third capacitor, and a control terminal coupled to the first conductor of the sixth capacitor; and a sixth transistor having a first terminal coupled to the first conductor of the sixth capacitor, having a second terminal coupled to the first conductor of the third capacitor, and a control terminal coupled to the first conductor of the fifth capacitor.

4. The circuit of claim 3, further comprising one or more additional charge pump stages coupled between the second charge pump stage and the output stage.

5. The circuit of claim 3, wherein the first, second, third, fourth, fifth, and sixth transistors are p-channel field effect transistors.

6. The circuit of claim 1, further comprising:

a resistor having a first terminal coupled to the first conductor of the third capacitor, and having a second terminal; and a seventh capacitor having a first conductor coupled to the second terminal of the resistor, and having a second conductor coupled to a reference terminal.

7. The circuit of claim 6, wherein:

the resistor is a first resistor; and the circuit further comprises:

a second resistor having a first terminal coupled to the first conductor of the seventh capacitor, and having a second terminal; and an eighth capacitor having a first conductor coupled to the second terminal of the second resistor, and having a second conductor coupled to the second conductor of the seventh capacitor.

8. The circuit of claim 7, further comprising a transformer including:

a primary winding; and a secondary winding including:

a first winding terminal coupled to the control terminal of the first transistor;

a second winding terminal coupled to the control terminal of the second transistor; and a center tap coupled to the reference terminal.

9. A method comprising:

in a first half of a cycle of a differential signal:

turning on a first transistor of a first charge pump stage to charge a first conductor of a first capacitor of the first charge pump stage;

boosting a voltage on a first conductor of a second capacitor of the first charge pump stage;

boosting a voltage on a first conductor of a third capacitor of a second charge pump stage; and turning on a second transistor of the second charge pump stage, based on a voltage at the first conductor of the first capacitor, to charge a first conductor of a fourth capacitor of the second charge pump stage.

10. The method of claim 9, further comprising:

in the first half of the cycle of the differential signal:

turning on a third transistor of an output stage, based on a voltage at a first conductor of the fourth capacitor, to charge a filter circuit based on the voltage on the first conductor of the third capacitor.

11. The method of claim 9, further comprising:

in a second half of the cycle of the differential signal:

turning on a third transistor of the first charge pump stage to charge a first conductor of the second capacitor.

12. The method of claim 11, further comprising:

in the second half of the cycle of the differential signal:

boosting a voltage on a first conductor of the first capacitor; and boosting a voltage on a first conductor of the fourth capacitor.

13. The method of claim 11, further comprising:

in the second half of the cycle of the differential signal:

turning on a fourth transistor of the second charge pump stage, based on a voltage at a first conductor of the second capacitor, to charge a first conductor of the third capacitor.

14. The method of claim 13, further comprising:

in the second half of the cycle of the differential signal:

turning on a fifth transistor of an output stage, based on a voltage at the first conductor of the third capacitor, to charge a filter circuit and a common-mode filter based on the voltage on the first conductor of the fourth capacitor.

15. An isolator circuit comprising:

a transformer including:

a primary winding; and a secondary winding having a first winding terminal, a second winding terminal, and a center tap terminal;

a charge pump stage including:

a first transistor having a first terminal coupled to the first winding terminal, having a second terminal, and having a control terminal coupled to the second winding terminal;

a second transistor having a first terminal coupled to the second winding terminal, having a second terminal, and having a control terminal coupled to the first winding terminal;

a first capacitor having a first conductor coupled to the second terminal of the first transistor, and having a second conductor coupled to the second winding terminal;

a second capacitor having a first conductor coupled to the second terminal of the second transistor, and having a second conductor coupled to the first winding terminal;

a common-mode filter including:

a third capacitor having a first conductor coupled to the second terminal of the first transistor, and having a second conductor coupled to the second winding terminal; and a fourth capacitor having a first conductor coupled to the first conductor of the third capacitor, and having a second conductor coupled to the first winding terminal.

16. The isolator circuit of claim 15, wherein:

the charge pump stage is a first charge pump stage; and the isolator circuit further comprises:

a second charge pump stage including:

a third transistor having a first terminal coupled to the first conductor of the first capacitor, having a second terminal, and having a control terminal coupled to the first conductor of the second capacitor;

a fourth transistor having a first terminal coupled to the first conductor of the second capacitor, having a second terminal, and having a control terminal coupled to the first conductor of the first capacitor;

a fifth capacitor having a first conductor coupled to the second terminal of the third transistor and the first conductor of the third capacitor, and having a second conductor coupled to the first winding terminal; and a sixth capacitor having a first conductor coupled to the second terminal of the fourth transistor and the first conductor of the third capacitor, and having a second conductor coupled to the second winding terminal.

17. The isolator circuit of claim 16, further comprising an output stage including:

a fifth transistor having a first terminal coupled to the first conductor of the fifth capacitor, a second terminal coupled to the first conductor of the third capacitor, and a control terminal coupled to the first conductor of the sixth capacitor; and a sixth transistor having a first terminal coupled to the first conductor of the sixth capacitor, a second terminal coupled to the first conductor of the third capacitor, and a control terminal coupled to the first conductor of the fifth capacitor.

18. The isolator circuit of claim 17, further comprising one or more additional charge pump stages coupled between the second charge pump stage and the output stage.

19. The isolator circuit of claim 15, further comprising:

a resistor having a first terminal coupled to the first conductor of the third capacitor, and having a second terminal; and a seventh capacitor having a first conductor coupled to the second terminal of the resistor, and having a second conductor coupled to the center tap terminal.

20. The isolator circuit of claim 19, wherein:

the resistor is a first resistor; and the isolator circuit further comprises:

a second resistor having a first terminal coupled to the first conductor of the seventh capacitor, and having a second terminal; and an eighth capacitor having a first conductor coupled to the second terminal of the second resistor, and having a second conductor coupled to the second conductor of the seventh capacitor.

21. A circuit comprising:

a charge pump stage including:

a first transistor having first and second terminals and a control terminal;

a second transistor having a first terminal coupled to the control terminal of the first transistor, having a second terminal, and having a control terminal coupled to the first terminal of the first transistor;

a first capacitor having a first conductor coupled to the second terminal of the first transistor and having a second conductor coupled to the control terminal of the first transistor;

a second capacitor having a first conductor coupled to the second terminal of the second transistor and having a second conductor coupled to the control terminal of the second transistor;

a common-mode filter including:

a third capacitor having a first conductor coupled to the second terminal of the first transistor and having a second conductor coupled to the control terminal of the first transistor; and a fourth capacitor having a first conductor coupled to the first conductor of the third capacitor and having a second conductor coupled to the control terminal of the second transistor;

a second charge pump stage including:

a third transistor having a first terminal coupled to the first conductor of the first capacitor, having a second terminal, and having a control terminal coupled to the first conductor of the second capacitor;

a fourth transistor having a first terminal coupled to the first conductor of the second capacitor, having a second terminal, and having a control terminal coupled to the first conductor of the first capacitor;

a fifth capacitor having a first conductor coupled to the second terminal of the third transistor and having a second conductor coupled to the control terminal of the second transistor; and a sixth capacitor having a first conductor coupled to the second terminal of the fourth transistor and having a second conductor coupled to the control terminal of the first transistor; and an output stage including:

a fifth transistor having a first terminal coupled to the first conductor of the fifth capacitor, having a second terminal coupled to the first conductor of the third capacitor, and a control terminal coupled to the first conductor of the sixth capacitor; and a sixth transistor having a first terminal coupled to the first conductor of the sixth capacitor, having a second terminal coupled to the first conductor of the third capacitor, and a control terminal coupled to the first conductor of the fifth capacitor.

22. A method comprising:

in a first half of a cycle of a differential signal:

turning on a first transistor of a first charge pump stage to charge a first conductor of a first capacitor of the first charge pump stage;

boosting a voltage on a first conductor of a second capacitor of the first charge pump stage;

boosting a voltage on a first conductor of a third capacitor of a second charge pump stage; and turning on a second transistor of the second charge pump stage, based on a voltage at the first conductor of the first capacitor, to charge a first conductor of a fourth capacitor of the second charge pump stage; and turning on a third transistor of an output stage, based on a voltage at a first conductor of the fourth capacitor, to charge a filter circuit based on the voltage on the first conductor of the third capacitor.

23. An isolator circuit comprising:

a transformer including:

a primary winding; and a secondary winding having a first winding terminal, a second winding terminal, and a center tap terminal;

a charge pump stage including:

a first transistor having a first terminal coupled to the first winding terminal, having a second terminal, and having a control terminal coupled to the second winding terminal;

a second transistor having a first terminal coupled to the second winding terminal, having a second terminal, and having a control terminal coupled to the first winding terminal;

a first capacitor having a first conductor coupled to the second terminal of the first transistor, and having a second conductor coupled to the second winding terminal;

a second capacitor having a first conductor coupled to the second terminal of the second transistor, and having a second conductor coupled to the first winding terminal;

a common-mode filter including:

a third capacitor having a first conductor coupled to the second terminal of the first transistor, and having a second conductor coupled to the second winding terminal; and a fourth capacitor having a first conductor coupled to the first conductor of the third capacitor, and having a second conductor coupled to the first winding terminal;

a second charge pump stage including:

a third transistor having a first terminal coupled to the first conductor of the first capacitor, having a second terminal, and having a control terminal coupled to the first conductor of the second capacitor;

a fourth transistor having a first terminal coupled to the first conductor of the second capacitor, having a second terminal, and having a control terminal coupled to the first conductor of the first capacitor;

a fifth capacitor having a first conductor coupled to the second terminal of the third transistor and the first conductor of the third capacitor, and having a second conductor coupled to the first winding terminal; and a sixth capacitor having a first conductor coupled to the second terminal of the fourth transistor and the first conductor of the third capacitor, and having a second conductor coupled to the second winding terminal;

an output stage including:

a fifth transistor having a first terminal coupled to the first conductor of the fifth capacitor, a second terminal coupled to the first conductor of the third capacitor, and a control terminal coupled to the first conductor of the sixth capacitor; and a sixth transistor having a first terminal coupled to the first conductor of the sixth capacitor, a second terminal coupled to the first conductor of the third capacitor, and a control terminal coupled to the first conductor of the fifth capacitor.

\* \* \* \* \*